United States Patent [19]
Kamewada

[11] Patent Number: 5,717,455
[45] Date of Patent: Feb. 10, 1998

[54] SYSTEM AND METHOD FOR THREE DIMENSIONAL IMAGE ACQUISITION AND PROCESSING OF A BOREHOLE WALL

[75] Inventor: Shunichi Kamewada, Nishi-Ku, Japan

[73] Assignee: Raax Co., Ltd., Sapporo, Japan

[21] Appl. No.: 674,397

[22] Filed: Jul. 2, 1996

[51] Int. Cl.[6] .................................................. H04N 7/18
[52] U.S. Cl. .................................................. 348/85; 356/241
[58] Field of Search .............................. 348/46, 85, 84, 348/45, 42, 49, 337; 356/241; 362/349; 359/599, 641, 831, 833, 834, 838, 850, 857, 864, 894, 211; H04N 7/18, 9/47

[56] References Cited

U.S. PATENT DOCUMENTS

| | | | |
|---|---|---|---|
| 3,279,085 | 10/1966 | Reinhart | 348/85 |
| 4,725,883 | 2/1988 | Clark, Jr. et al. | 348/84 |
| 4,915,489 | 4/1990 | Minko | 359/834 |
| 4,941,723 | 7/1990 | Sasada | 359/599 |
| 5,134,468 | 7/1992 | Ohmuro | 348/337 |
| 5,321,259 | 6/1994 | Morgan | 359/211 |
| 5,543,972 | 8/1996 | Kamewada | 359/834 |

FOREIGN PATENT DOCUMENTS

504413A1  9/1992  European Pat. Off.

*Primary Examiner*—Tommy P. Chin
*Assistant Examiner*—Y. Lee
*Attorney, Agent, or Firm*—Baker & Botts, L.L.P.

[57] ABSTRACT

This invention provides a three dimensional image acquisition and processing method and system that enable three dimensional viewing of an underground borehole wall. Also provided are a cylindrical straight prism and a counter cylindrical straight prism that are used in this method and system of three dimensional viewing of a borehole wall.

15 Claims, 11 Drawing Sheets

SYSTEM AND METHOD FOR THREE DIMENSIONAL IMAGE ACQUISITION AND PROCESSING OF A BOREHOLE WALL

FIELD OF THE INVENTION

This invention relates to a three dimensional image acquisition and processing system and method, as well as a cylindrical prism used in the method and system that enables three dimensional viewing of an underground borehole wall.

BACKGROUND OF THE INVENTION

In the field of geological survey, it is necessary to know the serial condition of the face, as well as the direction of strata, fractures, and other underground information. However, in the past, only a two dimensional image of the borehole wall was available from the existing borehole survey methods. Because of that, even when there is a void or a crack in the borehole wall, or the borehole shape is deformed due to the ground stress, the information available was not clear and it was difficult to identify such existing faults. One previous method of conducting these geological surveys was conducted by lowering a probe with the TV camera into the borehole to examine the borehole wall directly. In this system, the image of the borehole wall was reflected to the TV camera by a plane mirror which was placed at a 45 angle in relation to the borehole wall.

Another method was developed where a cylindrical probe moved up and down in the borehole and the portion toward the side wall was equipped with a transparent window. Re: MIRROR FOR PRODUCING A DEVELOPMENT PICTURE OF THE WALL OF A BOREHOLE IN THE GROUND AND DEVICE THEREFORE (U.S. patent application Ser. No. 07/867,226, filed Jun. 5, 1992). The probe contained a truncated conical mirror that had a hole in the direction of center axis, and also had a side face that was treated with metal plating or some other reflective material, in order to create a mirror effect. This truncated conical mirror was placed so that the reflection of the image of the borehole wall through the transparent window would reflect in the direction of the axis. An azimuth compass was placed below the truncated conical mirror in order to detect direction, and a TV camera was placed above the truncated conical mirror to capture through the center hole the reflection from the conical mirror and the direction indicated by the azimuth compass.

SUMMARY OF THE INVENTION

It is, therefore, an object of the present invention to provide a three dimensional image acquisition and processing method that enables three dimensional viewing of an underground borehole wall.

Another object of the invention is to provide a three dimensional image acquisition and processing system that enables three dimensional viewing of an underground borehole wall.

Yet another object of the present invention is to provide a cylindrical prism used in the method and system that enables three dimensional viewing of an underground borehole wall.

Thus, in accordance with one aspect of the present invention, there is provided a method for producing a three dimensional image of a borehole wall. The method comprises the steps of receiving a first visual image from a portion of a borehole wall through a first cylindrical prism, wherein the first cylindrical prism is located in the interior of the borehole; receiving a second visual image from the portion of the borehole wall through a second cylindrical prism, wherein the second cylindrical prism is located in the interior of the borehole and adjacent to the first cylindrical prism, and the second visual image is from a different orientation of the borehole wall than the first visual image; reflecting the first visual image on a conical mirror that is located inside the first cylindrical prism to create a first ring shaped image of the borehole wall; reflecting the second visual image on the conical mirror to create a second ring shaped image of the borehole wall that is located adjacent to the first ring shaped image; and processing the first and second ring shaped images by dividing the images into sections in order to create a left eye viewing image and a right eye viewing image.

Preferably, the first cylindrical prism is a cylindrical straight prism and the second cylindrical prism is a counter cylindrical straight prism, wherein the cylindrical straight prism and the counter straight cylindrical prism are made of a transparent material; the cylindrical straight prism and the counter cylindrical straight prism comprise a plurality of triangular columns, wherein each of a plurality of grooves is positioned between a corresponding pair of the plurality of triangular columns. Also, the cylindrical straight prism is placed adjacent to and either above or below of the counter cylindrical straight prism.

In one embodiment, each of the plurality of triangular columns preferably has a cross-sectional shape of a right triangle wherein the orientation of each of the plurality of triangular columns in the counter cylindrical straight prism and the cylindrical straight prism are replaced by a single prism that is equal in length to the combined lengths of the cylindrical straight prism and the counter cylindrical straight prism.

In another embodiment, each of the plurality of triangular columns preferably has a cross-sectional shape of a isosceles triangle, wherein the counter cylindrical straight prism is the same as and connected to the cylindrical straight prism. Two light beams go through one side of the isosceles triangle, then refract in another direction. After the refraction, we can separate each beam which has the same direction of refraction by means of the computer method as described below, to pick up the pixels and separate them based on their location upon the conical mirror image.

In accordance with additionally preferred embodiments, there is provided a prism for producing a three dimensional image of a borehole wall, wherein the prism comprises a transparent cylinder which includes a plurality of triangular columns along the circumference (preferably the outer, but can be the inner) of the cylinder, and each of a plurality of grooves is between an adjacent pair of the plurality of triangular columns. Preferably, each of the plurality of triangular columns preferably has a cross-sectional shape of a right triangle. With respect to additional preferred embodiments, each of the plurality of triangular columns has a cross-sectional shape of a modified isosceles triangle.

In accordance with another aspect of the present invention, there is provided a system for producing a three dimensional image of a borehole wall, comprising a surveying body device; a first cylindrical prism having a central axis, wherein the first cylindrical prism is connected to the surveying body device; a second cylindrical prism having a central axis, wherein the second cylindrical prism is placed adjacent to and below the first cylindrical prism, the central axis of the second cylindrical prism is aligned with the central axis of the first cylindrical prism, a first image of the borehole wall passes through the first cylindrical prism, and a second image of the borehole wall passes through the second cylindrical prism; a camera device connected to the surveying body device; a conical mirror device having a center axis and connected to the surveying body device, wherein the conical mirror device is located in the interior of both prisms and the central axis of the conical mirror device aligned with the center axis of both the first cylindrical prism and the second cylindrical prism, the first image of the borehole wall is received from the first cylindrical prism and reflected by the conical mirror device to the camera device, and the second image of the borehole wall is received from the second cylindrical prism and reflected by the conical mirror device to the camera device; and an image processing device connected to the camera device, wherein the first and second images of the borehole wall from the camera device are received by the image processing device, and the image processing device converts the first and second images of the borehole wall into a pair of stereoscopic images that includes a left eye image and a right eye image which then can be viewed with 3-D glasses to simulate a three dimensional image. Preferably, the first cylindrical prism is a cylindrical straight prism and the second cylindrical prism is a counter cylindrical straight prism, wherein the cylindrical straight prism and the counter cylindrical straight prism are made of a transparent material, the cylindrical straight prism and the counter cylindrical straight prism comprise a plurality of triangular columns, preferably along the outer perimeter, but can be along the inner perimeter, and each of a plurality of grooves is between a corresponding pair of the plurality of triangular columns. Also, preferably, each of the plurality of triangular columns has a cross-sectional shape of a right triangle.

In another embodiment, each of the plurality of triangular columns preferably is in the shape of a isosceles triangle, wherein the counter cylindrical straight prism and the cylindrical straight prism are replaced by a single prism that is equal in length to the combined lengths of the cylindrical straight prism and the counter cylindrical straight prism.

Preferably, the conical mirror device is longer than the combined height of the first cylindrical prism and the second cylindrical prism. Additionally, the conical mirror device comprises a first section and a second section wherein the slope of the first section is not equal to the slope of the second section.

In accordance with additional preferred embodiments, the system further comprises a correctional convex lens device partitioned relative to the conical mirror device and the camera device, such that all images that pass through the first cylindrical prism or the second cylindrical prism intersect the center axis of the conical mirror at a right angle. Preferably, the conical mirror device is a rotating parabolic mirror, positioned relative to the first and second cylindrical prisms such that all images that pass through the first cylindrical prism or the second cylindrical prism intersect the center axis of the conical mirror device at a right angle. Also, preferably, the conical mirror device is a flat top conical mirror that includes a hole or a cylinder shaped transparent material positioned along the center axis of the conical mirror device, wherein an image of an azimuth compass is received at the camera along with the images of the borehole wall.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

Figure 30:
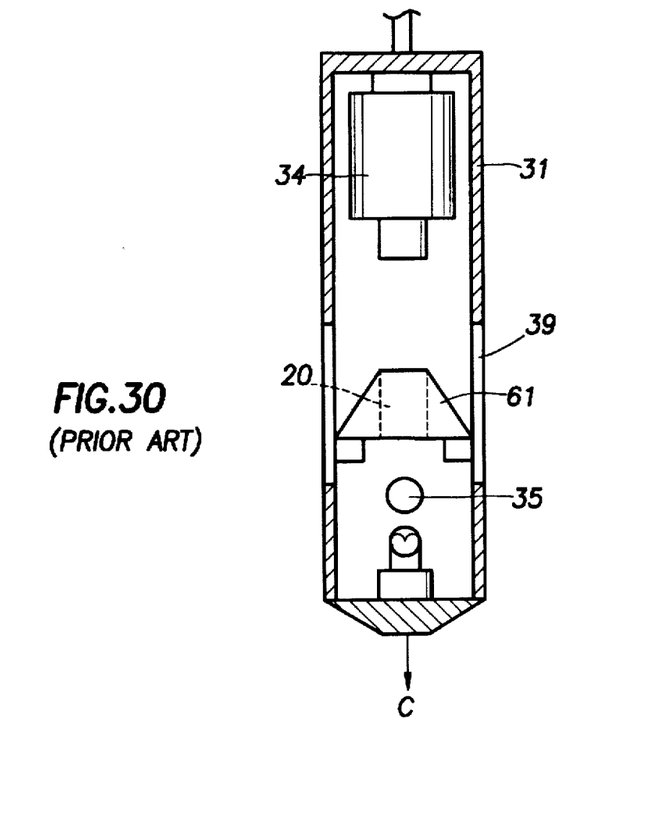
FIG. 30 is a cross-sectional view of a prior art borehole survey system.

Before beginning a discussion of the invention, it may be well to review the prior art as shown in FIG. 30. The cylindrical probe 31 moves up and down the borehole and the portion of the cylindrical probe 31 facing toward the sidewall is equipped with a transparent cylindrical window 39 having an outside diameter substantially equal to that of the probe 31. A truncated conical mirror 61 has a face F that is treated with metal plating to create the mirror effect, and has a cylindrical hole 20 located in the direction of the center axis C. The truncated conical mirror 61 is located so that the reflection of an image from borehole wall through the transparent window 39 will reflect toward to the TV camera lens located above of the conical mirror. An azimuth compass 35 is placed below the truncated conical mirror 61, and a TV camera 34 is placed above the truncated conical mirror 61 to capture both the image reflection and the azimuth compass image.

Figure 1:
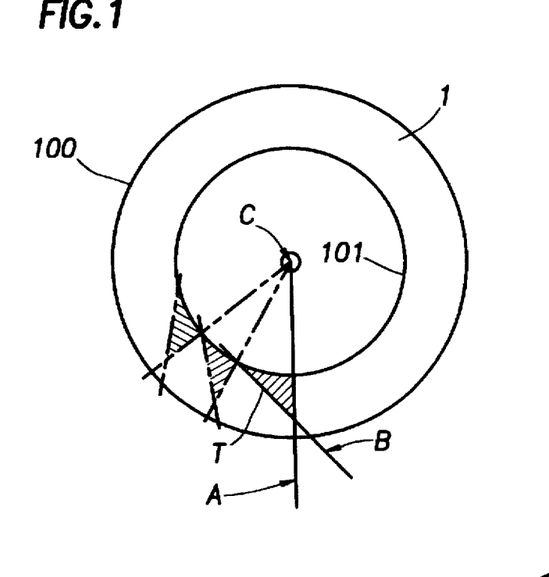
FIG. 1 is a top plan view of a cylindrical straight Fresnel prism according to the preset invention illustrating modified right triangles.
Figure 2:
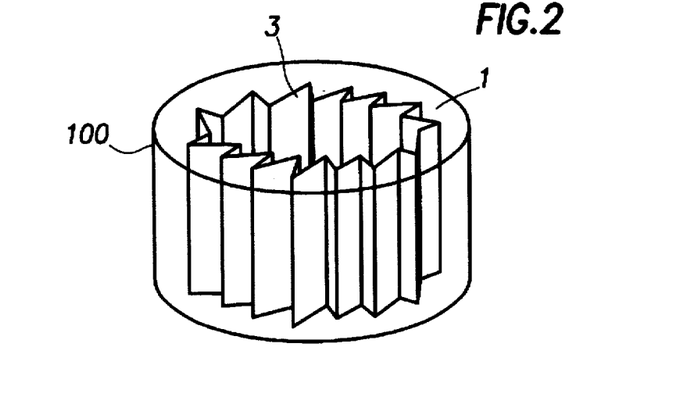
FIG. 2 is a prospective view of a cylindrical straight Fresnel prism according to the present invention.

FIG. 1 shows the structure of the present invention cylindrical straight Fresnel prism 100. Outside ring 1 is comprised of a transparent cylindrical material, for example, it can be made of a transparent plastic material, which is preferably transparent vinyl chloride. The plastic material to be used must be adequate for casting or molding, and be elastic enough to be formed into a sheet. FIG. 2 shows where two sides of a triangular column form grooves 3 of the prism. These grooves 3 are defined by one side A, which contains the center axis C of the prism 100, and another side B, which is defined by a line which is the intersection of side A and the outer circumference of cylinder 1, and line 101, which is a concentric circumference within outer ring 1 and contains a midpoint that is equal to the center axis C. In an alternate embodiment, these grooves 3 can also be placed all around the outside circumference of transparent cylindrical ring 1.

Figure 3A:
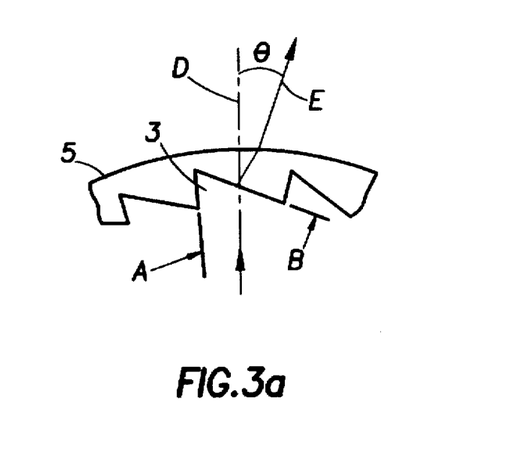
FIGS. 3(a) and (b) are partial top plan views of a cylindrical straight prism (FIG. 3a) and a counter equilateral cylindrical straight prism (FIG. 3b) illustrating the change of direction of an optical image by using the cylindrical straight Fresnel prism.

When using such a cylindrical prism 100, the optical pathway can be altered without changing the size of the image going through the prism. As shown in FIG. 3(a), when viewing a certain direction, as represented by optical pathway line D, by placing Fresnel prism groove 3 in the pathway of line D, another optical beam E with a direction of different angle θ can then be viewed. Furthermore, as shown in FIG. 3(b), a reversal of the position of groove face B in relation to groove face A will result in the creation of optical beam E' which is the mirror image of optical beam E around line D with an angle −θ.

Figure 3B:
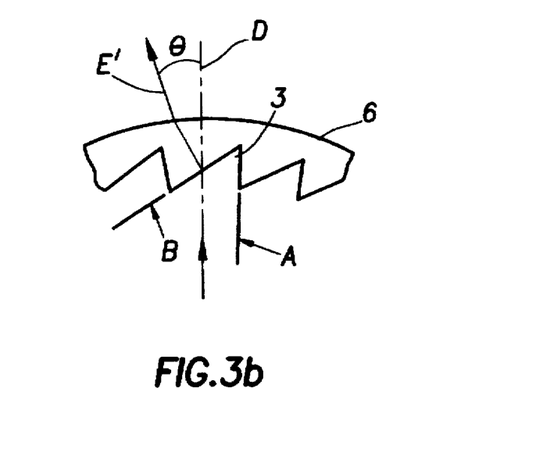
Figure 4:
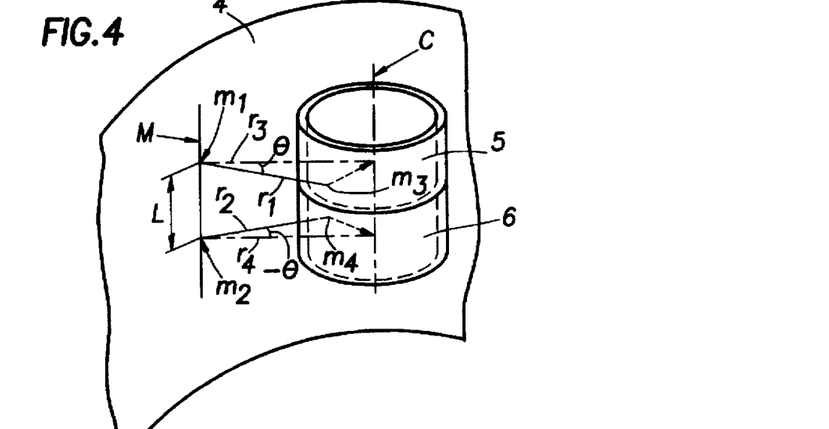
FIG. 4 is a graphical representation of images of a borehole wall as they enter the cylindrical prisms.

As shown in FIG. 4, the cylindrical Fresnel prism 5, with grooves 3 cut all along the inner circumference of the cylinder, as shown in FIG. 3(a), and the counter cylindrical Fresnel prism 6, with grooves that are a mirror image of the cylindrical prism 5, as shown in FIG. 3(b), are placed inside of the borehole on top of each other. The central axes of the prisms 5 and 6 in the borehole are substantially parallel to the borehole axis C. Also, the rotational orientation of prisms 5 and 6 in relation to each other is unimportant.

Points $m_1$ and $m_2$ on the borehole wall 4 lie on line M which is substantially parallel to the borehole axis C. Angle θ is formed by optical beams $r_1$ and $r_3$. Optical beam $r_3$ lies between point $m_1$ and the center axis C of prism 5. Optical beam $r_1$ lies between point $m_1$ and a point $m_3$ on the circumference of prism 5, such that beam $r_1$ is deflected by prism 5 toward the center axis C. Beams $r_1$ and $r_3$ lie on a plane that is perpendicular to the plane formed by lines M and center axis C. On the other hand, counter Fresnel prism 6 is a reversal of the Fresnel prism 5. Angle −θ is formed by optical beams $r_2$ and $r_4$; which lies between point $m_2$ and the center axis C of prism 6. Optical beam $r_2$ lies between point $m_2$ and a point $m_4$ on the circumference of prism 6, such that beam $r_2$ is deflected by the prism toward the center axis C. Beams $r_4$ and $r_2$ lie on a plane that is perpendicular to the plane formed by line M and center axis C. Accordingly, the circumference of the borehole wall 4 will be viewed inside of the counter Fresnel prism 6 as an image with angle −θ to the center For example, lowering the combined Fresnel prism by distance L will result in the movement of the cylindrical Fresnel prism 5 to a depth of point $m_2$. The image of the circumference of the borehole wall 4 from point $m_2$ is viewed at angle θ to the center axis C inside of the Fresnel prism 5. The image of the circumference of the borehole wall 4 from $m_2$ is obtained with a parallax angle of 2. By processing each image as a two dimensional image with one for the right eye and the other for the left eye, the images of the circumference of the borehole wall 4 can be produced as is explained below. Furthermore, by acquiring the images from the Fresnel prism 5 and the counter Fresnel prism 6 separately and continuously by means of video equipment, two separate images of the same point captured from two different orientations, the right and left eye images of the entire circumference of the borehole wall 4 can be processed.

As described above, an image can be captured by the circumference of the borehole wall inside of the Fresnel prisms, by rotating a plane mirror 360°, which is placed at a 45° angle to the central axis. In the present invention, a conical mirror is used as described below.

Figure 5:
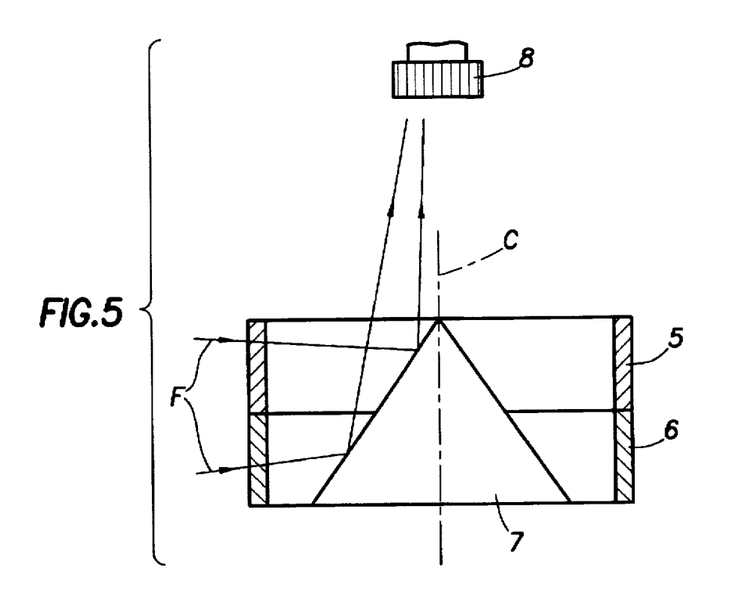
FIG. 5 is a cross-sectional view of the three dimensional imaging system of the present invention.

As shown in FIG. 5, the Fresnel prism 5 and the counter Fresnel prism 6 are stacked on top of each other along the direction of the axis C. Also, a conical mirror 7 is aligned along this same axis C. The length of conical mirror 7 can be either longer or shorter than that of the combined prisms 5 and 6, but should not be exactly the length of stacked Fresnel prisms 5 and 6. Optical beams F pass through the side of the Fresnel prisms 5 and 6 and travels toward the central axis C, and then are reflected by the conical mirror 7 in the direction of the axis C. A camera 8 is placed above the conical mirror 7 along axis C and captures the images reflected by conical mirror 7. Camera 8 can be either a still photo or a video camera. The two images, of which one is passed through Fresnel prism 5 and the other is passed through Fresnel prism 6, are both shown in the conical mirror image as an outside ring image and an inside ring image, of the circumference of the borehole wall 4, and will be captured separately. The image of the circumference of the borehole wall 4 will pass through the counter Fresnel prism 6 on the bottom portion, and the image of the circumference 4 passing through the Fresnel prism 5 on the top portion of the connected cylindrical Fresnel prisms 5 and 6.

Figure 6:
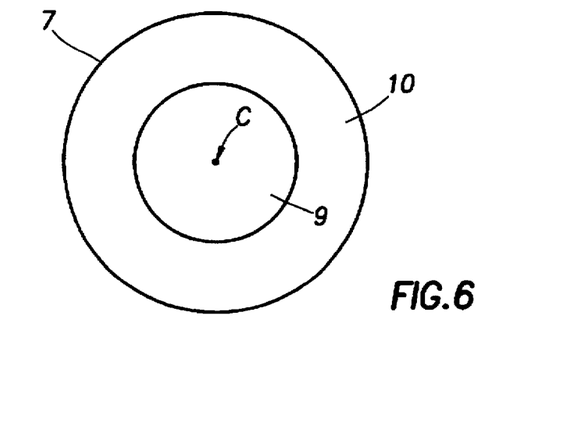
FIG. 6 is a top plan view of the conical mirror device.

As shown in FIG. 6, when capturing an image reflected by conical mirror 7 by a camera, the inside of the ring 9 will be the image of the upper portion of the borehole wall 4 from the Fresnel prism 5, and the outside of the ring 10 will be the image of the bottom portion of the borehole wall from the counter Fresnel prism 6.

Figure 7:
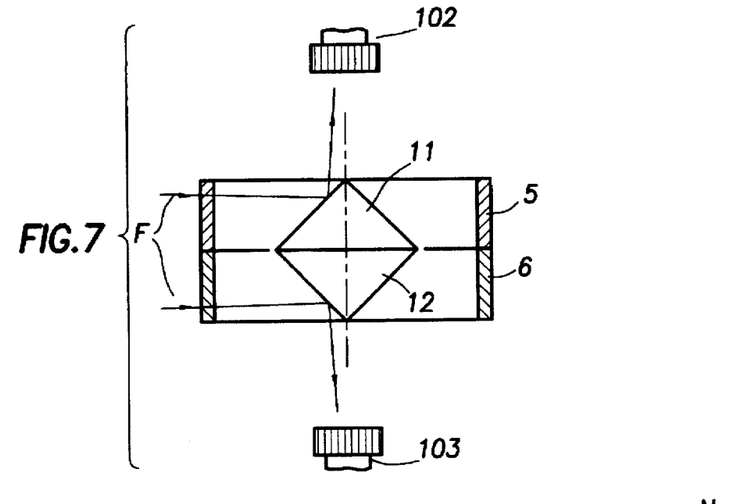
FIG. 7 is another embodiment of the three dimensional imaging system of the present invention.

Another embodiment is shown in FIG. 7. Here, a conical mirror 11 is installed in the Fresnel prism 5, and another conical mirror 12 is installed in the counter Fresnel prism 6, with the prisms located on top of each other and the apexes of the conical mirror 11 and 12 pointing in opposite directions. A pair of cameras 102 and 103, one for the Fresnel prism 5, and the other for the counter Fresnel prism 6, are placed to capture the ring shaped images F of the borehole wall 4 separately.

The image of the circumference acquired in the above method will be transmitted to above ground equipment by means of cable, or other method. The image viewed on the monitor will appear as shown in FIG. 6. This analog data of the image will then be converted into digital data and put in a preliminary image memory, where it will be broken up into a matrix of pixels. Pixels on the circumference of each scan will be extracted one by one and realigned to form a processing routine in the image processing memory. This process will be repeated as the conical mirror moves through the borehole, and a continuous image will be processed. The distance of the movement of the conical mirror in the borehole is measured by such equipment as a depth measuring device, where an electric pulse from the device will send a signal to repeat the routine automatically.

As described below, there are two methods to process a set of images (one for the left eye and one for the right eye) for the purpose of three dimensional image viewing.

Figure 8:
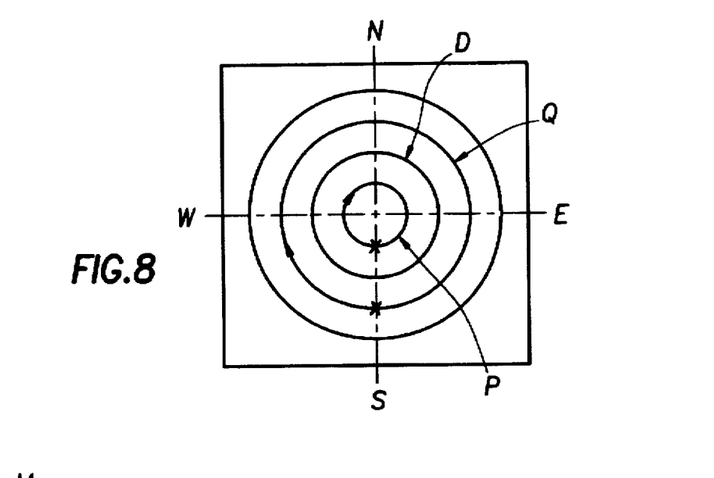
FIG. 8 is a graphical representation of the method of creating the ring shaped images.

The first method is shown in FIG. 8. An image from the conical mirror, scan line P, represents the image from the Fresnel prism 5, and scan line Q represents the image from the counter Fresnel prism 6. As the imaging system moves through the borehole, the image of the circumference of the borehole wall 4 will appear on scan lines P and Q. First, using directional meter information from the image, a clockwise scan is started from point S, then the scan data is realigned in a straight line. Next, the data is assigned from scan line P to the left eye image, and the data from scan line Q to the right eye image. Line D in diagram 8 is the borderline between images produced by the Fresnel prism 5 and the counter Fresnel prism 6.

Figure 9:
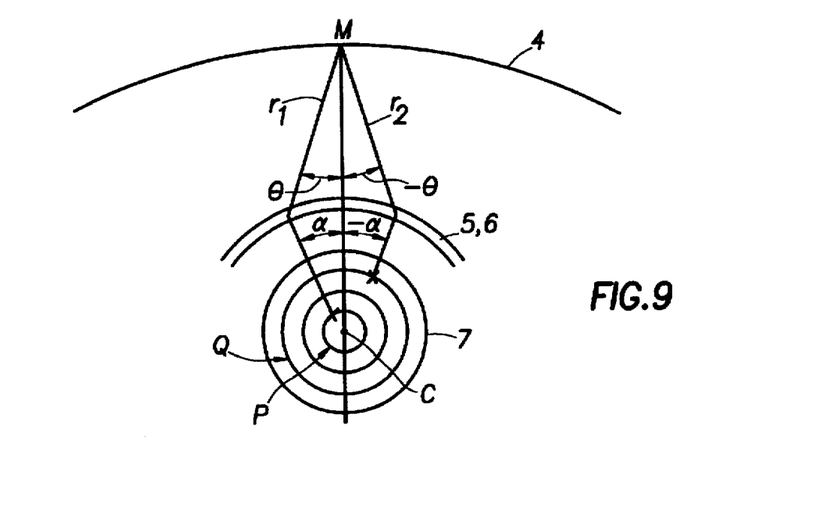
FIG. 9 is a graphical representation of images from a borehole wall as they enter the cylindrical prism.
Figure 10A:
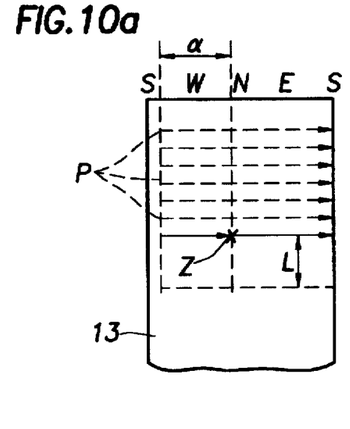
FIG. 10 is a graphical representation of images shown in FIG. 9.
Figure 10B:
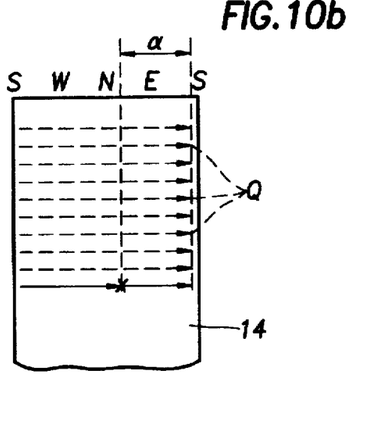

As shown in FIG. 9, the direction of optical beams $r_1$ and $r_2$ from the borehole wall 4 (looking upward along the center axis C), which corresponds to scan lines P and Q, create a parallactic angle of $2\theta$, and enter the conical mirror 7 at an angle of $2\theta0$. As shown in FIGS. 10(a) and 10(b), each horizontal line P and Q represent one revolution of the three-dimensional imaging device, as shown in FIG. 9. The image of scan line P is shown ahead by $\alpha$ in the S direction in the ring shaped image, and will be the start of processing. Point Z of the processed image display will be the image 13 for the left eye. Likewise, as shown in FIG. 10(b), the image of scan line Q is behind by $\alpha$ in the S direction in the ring shaped image, and will be the image 14 for the right eye. As shown on FIG. 4, the image on scan line P is viewed a distance L above the scan line Q. The image of scan line Q will then be processed and displayed ahead by a distance equivalent to L, as shown in FIG. 10(a).

Figure 11:
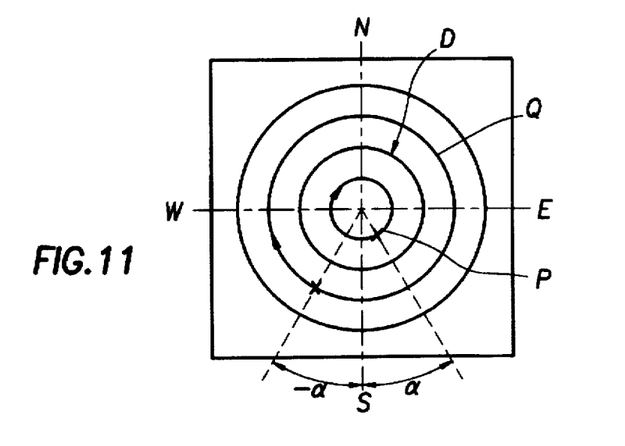
FIG. 11 is a graphical representation of the method of creating the ring shaped images.
Figure 12A:
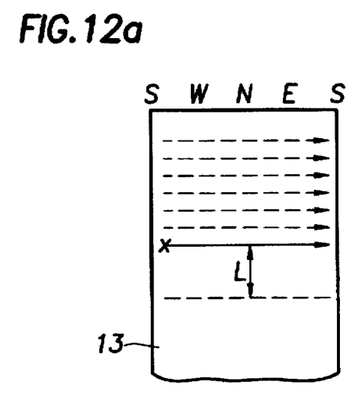
FIGS. 12(a) and (b) are graphical representations of the method of creating the ring shaped images.
Figure 12B:
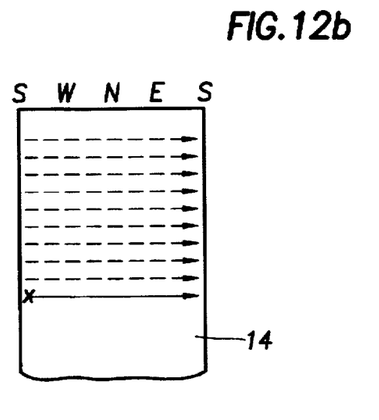

The second method of image processing is shown in FIG. 11. Scan lines P and Q are established in the ring-shaped image by the same method as that described in FIG. 9. The scan will proceed clockwise, and the images from scan line P will be for the left eye, and the images from scan line Q will be for the right eye. The image of scan line P is shown ahead by $\alpha$ in the S direction, while the position to start processing is behind by $-\alpha$ counterclockwise in the S direction. Each pixel that is obtained is inputted starting from position S at the far left of the processed image memory, as shown in FIG. 12(a). It is then displayed in a monitor, and becomes the image 13 for the left eye. Likewise, the image of scan line Q is behind by $-\alpha$, while the position to start processing is ahead by $\alpha$ clockwise in the S direction in the preliminary image memory. Each pixel that is obtained is inputted starting from position S at the far left of the processed image memory as shown in FIG. 12(b). It is also displayed in a monitor, and becomes the image 14 for the right eye. The image of scan line P is viewed from above the image of scan line Q by a difference equivalent to L. Furthermore, the image of scan line Q will start displaying ahead by distance L in the process image memory.

In a situation where the orientation of the acquired image is important, it is possible to design the structure so that the orientation is controlled automatically by rotating the camera by means of a direction control device about the axis, while the top of the image is always facing N as shown in FIGS. 8 and 11. This is done in the same manner as indicated in a prior art system in FIG. 30, specifically the image of the azimuth compass is viewed through a hole in the center of the conical mirror which is aligned with the center axis. The azimuth sensor device may be an azimuth compass having a needle or a magnetic azimuth sensor which provides an electronic signal. Directing towards the electronic signal detected by the azimuth sensor device, the TV camera is controlled to face a certain direction by pivoting about the center axis with an internal motor. The point of reference is determined by a certain point, such as the S direction, which is located in the preliminary image memory. The above point of reference for processing can be controlled either manually or automatically, and a direction in the ring-shaped image is detected by means of the needle of an azimuth sensor compass in the ring-shaped image or by a signal from a magnetic azimuth sensor. The director of the ring-shaped image is changed by eventually rotating the probe, but the direction of the ring-shaped image is detected by means of an image the needle of an azimuth sensor compass in the ring-shaped image or by a signal from a magnetic azimuth sensor so that the starting point of the scanning of the image can be controlled either manually or automatically to a certain direction, such as S.

Figure 13:
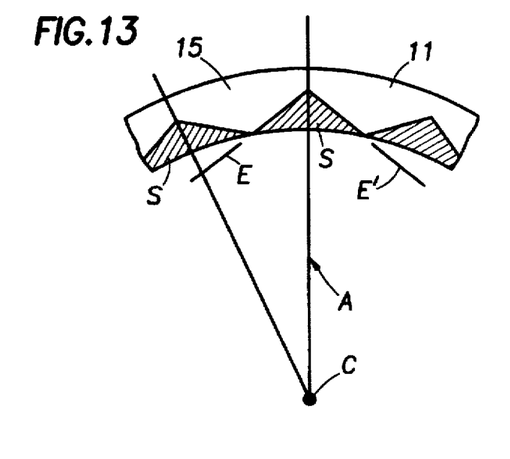
FIG. 13 is a top plan view of a cylindrical straight Fresnel prism illustrating the isosceles triangles.

In another embodiment of the present invention shown in FIG. 13, a cylindrical straight line Fresnel prism 15 can also be used. Planes E and E' are symmetrical in relation to plane A, which includes the center axis C of a transparent cylinder 11. Planes E and E' intersect within the inner cylinder wall 11, and grooves which are defined by E and E' in a shape of triangle are formed repeatedly throughout the interior of cylinder wall 11. Alternatively, these type of grooves can be formed in the outer face of the cylinder instead.

Figure 14:
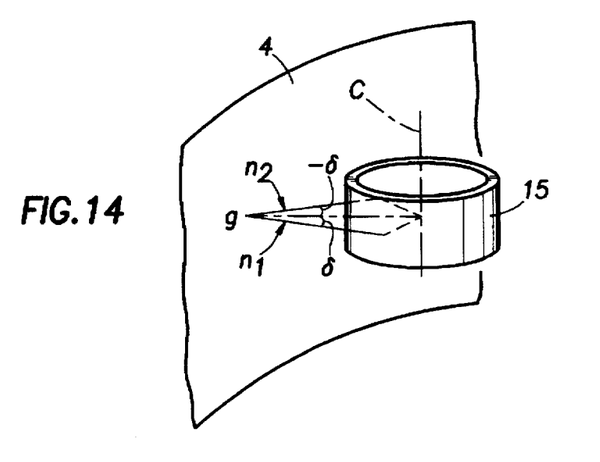
FIG. 14 is a graphical representation of images of a borehole wall as they enter the cylindrical prisms.
Figure 15:
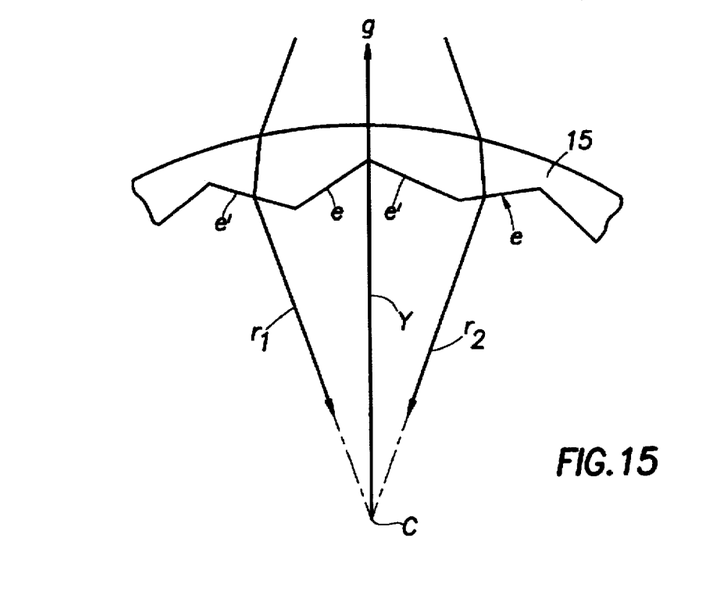
FIG. 15 is a top plan view of a cylindrical prism illustrating the isosceles triangles.

In FIG. 14, an isosceles triangle cylindrical straight prism 15 is placed in a the borehole along the circumference wall 4. From point g on the borehole wall 4, optical beams $n_1$ and $n_2$ proceed outward in two different directions. Optical beam $n_1$ has angle $\delta$ to the plane that contains center axis C and point g, and optical beam $n_2$ has angle $-\delta$ to the plane that contains center axis C and point g. In isosceles triangle cylindrical straight prism 15 there are two faces, as shown in FIG. 15. Face e is formed by plane E and face e' is formed by plane E', with planes E and E', as shown in FIG. 13. The direction of optical beams $r_1$ and $r_2$ will alter after passing through e and e' in relation to the line Y between point g on the borehole wall 4 and the center axis C. From point g, two images, one through the prism face e, and the other through the prism face e', can be acquired. These images are then used to create the three dimensional viewing, with one image for the left eye, and the other image for the right eye.

A conical mirror is placed inside of this Fresnel prism, and as described above, the camera captures images from this conical mirror. Then, two sets of ring-shaped, divided images, are arranged alternately with one set of images from prism face e and the other set of images from prism face e'. The method of processing these images for three dimensional viewing is presented below.

The reflecting points of each beam are fixed on the conical mirror surface. Once the conical mirror image is digitized on the image memory, each pixel of the image can be separated based on its address which relates to the reflecting points on the conical mirror. Then, the pixels which would consist of the left eye image are picked up and be formed into a image. The right eye image is similarly formed.

Figure 16:
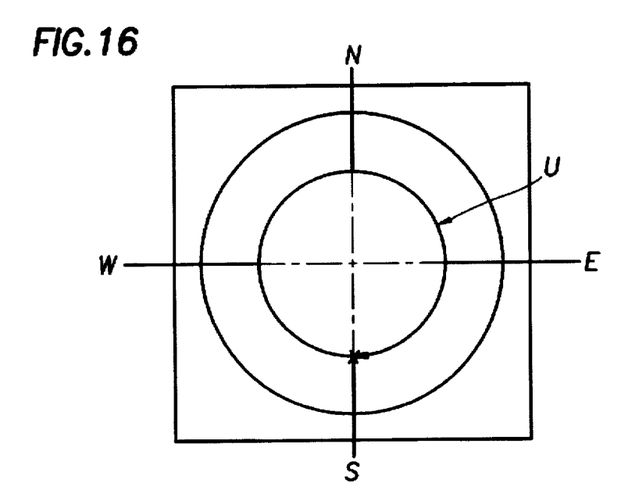
FIG. 16 is a graphical representation of the method of creating the ring shaped images.

In a preferred embodiment, the double Fresnel prisms contain 360 grooves. When placed in the borehole, the image of the borehole wall 4 can be processed from two sets of 360 sections of the borehole image, of which each set faces a different direction. As shown in FIG. 16, starting from scan line U, numbers are assigned for each of the 720 sections in the ring shaped image. Next, two sets of images are processed, one created from all of the odd numbered images and one created from all the even numbered images. One image is for left eye viewing and the other is for right eye viewing.

The method of placing the images within the processing memory is shown in FIG. 17. For example, if the isosceles triangle cylindrical straight prism has 360 columns of isosceles triangles on the surface, 720 pixels can be received from a scanning circle lines which relate to the 720 sides of the isosceles triangles. Then, assign a number from, 1 to 720, to each pixel. These 720 pixels can be divided into an odd numbered group and an even numbered group. These two group form the right eye image and the left eye image. Next, any location error images caused by the refraction angle of the prism, $2\alpha$ can be corrected.

Figure 17A:
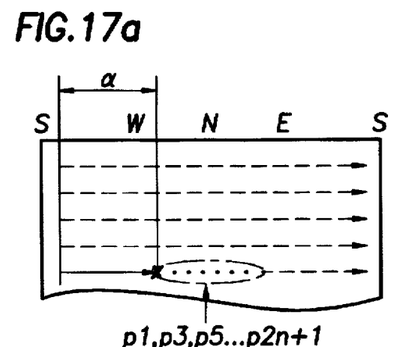
FIGS. 17(a) and (b) are graphical representations of the method of creating the ring shaped images.
Figure 17B:
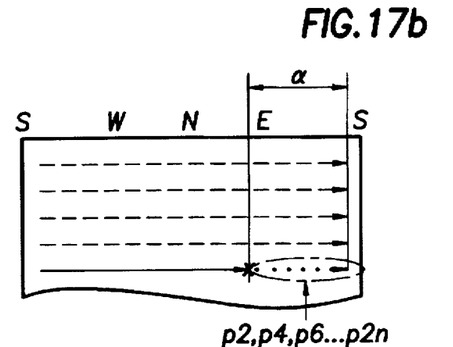

As beams are received, as shown in FIG. 9, with the optical beams having corresponding angles $\alpha$ in relation to the reflection angle of the prism, for example, the set of pixels from the odd numbered images will be processed for right eye viewing, as shown in FIG. 17(a), and the set of pixels from the even numbered images will be processed for left eye viewing, as shown in FIG. 17(b). In the embodiment of the invention using the double Fresnel prism, both the left eye image and the right eye image can be acquired on the same scan line, therefore, it is not necessary to switch the upper and lower positions. In other words, the distance L would be equal to zero, as shown in FIG. 12. Whether each set of the processed images is for the left eye viewing or for the right eye viewing is dependent upon the position of the process starting point. By preparing the double Fresnel prism with a one-half cycle twist within the range of the isosceles triangle, an adjustment can be made by altering the scan diameter. By this method, the order of the pixels of the left eye image and right eye image can be changed.

Figure 18:
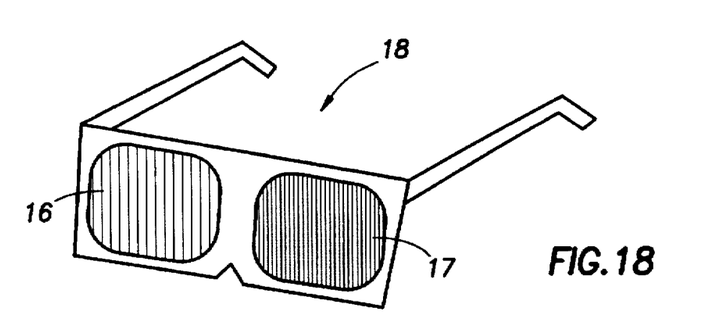
FIG. 18 is a prospective view of a pair of three dimensional imaging glasses.
Figure 19:
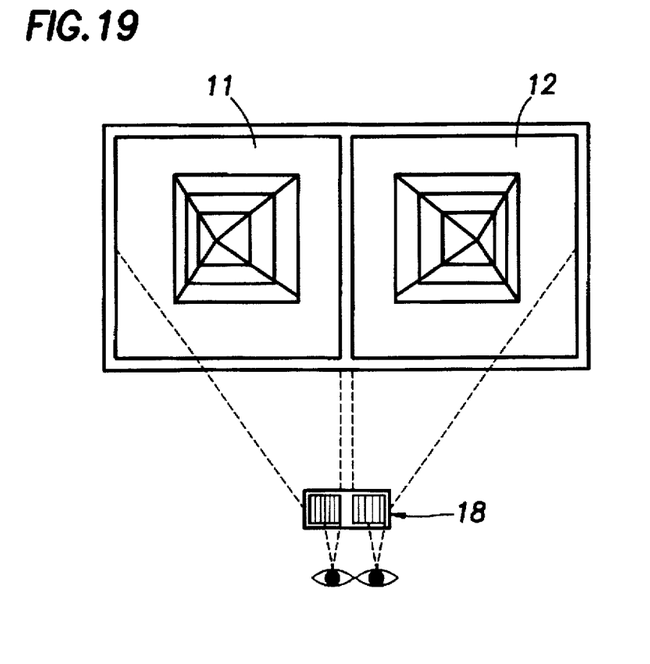
FIG. 19 is a graphical representation of left and right eye images and a pair of three dimensional glasses.

The various methods of viewing the image in three dimensions by using the images for the left eye and for the right eye are as follows. As shown in FIG. 19, the first method is when the Fresnel prism glasses 18 (also shown in FIG. 18) are used to view the right eye and left eye images separately. Fresnel prism glasses 18 are made by forming the Fresnel prism flat, rather than cylindrical as shown in FIG. 3, and are installed on the lens part of the glasses.

The second embodiment of the method is when the three dimensional images for the left and right eyes are displayed alternately in the same place on a monitor screen. This method requires viewing with special eye glasses with a continuous operating liquid crystal shutter.

The third embodiment of the method is when the three dimensional images for the left and right eyes are displayed alternately, and then viewed using a special lens installed on the monitor screen.

The fourth embodiment of the method is to use a pair of goggles which have installed two small displays inside of it. The left eye image and right eye image will be displayed separately on each display and will produce the stereoscopic view.

Figure 20A:
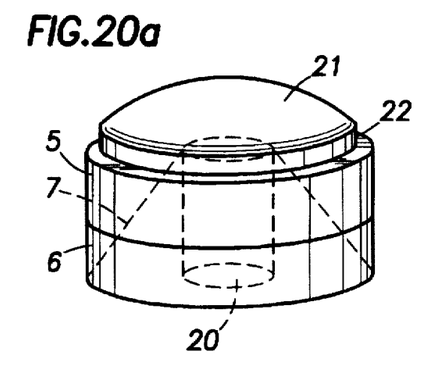
FIG. 20(a) is a prospective view of the prism and the conical mirror.
Figure 20B:
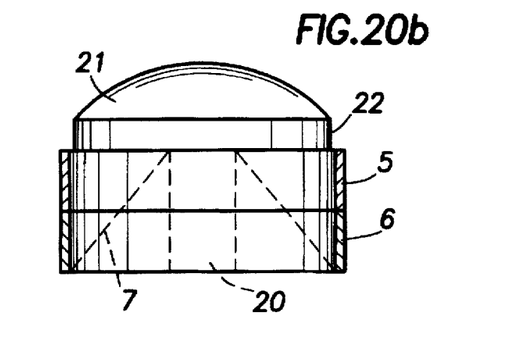
FIG. 20(b) is a cross-sectional view of the prism and the conical mirror.
Figure 20C:
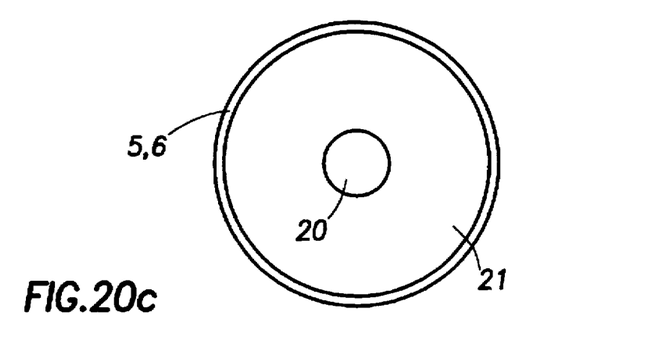
FIG. 20(c) is a top plan view of the prism and the conical mirror.

Another embodiment of the invention is shown of the prisms and the mirror by a prospective view in FIG. 20(a), a cross-sectional view in FIG. 20(b), and a top plan view in FIG. 20(c). In these three figures, the cylindrical Fresnel prism 5 and the counter Fresnel prism 6 are stacked on top of each other, and a conical mirror 7 with a cylindrical shaped hole in the center 20 is placed inside and is substantially aligned with the center axis of Fresnel prism 5 and 6. Additionally, a correction lens 21 is placed above the top of conical mirror 7 and is connected to the Fresnel prisms by a holder 22. Preferably, holder 22 is made with an opaque material that is either metal or plastic.

Figure 21:
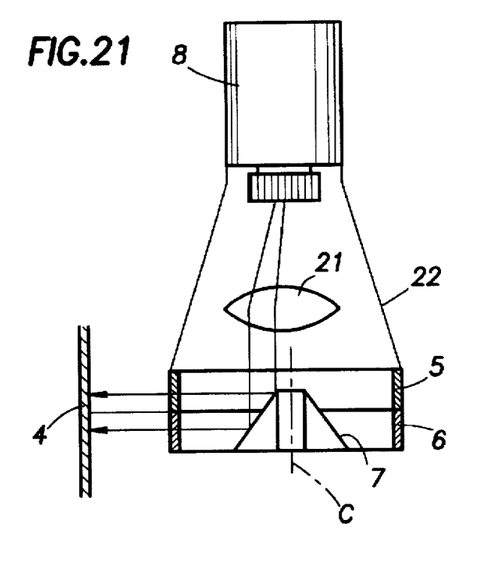
FIG. 21 is a graphical representation of the three dimensional imaging system with a correctional lens.

As shown in FIG. 21, the correctional lens 21 is placed between the conical mirror 7 and a camera 8 to correct the optical beams F that have spread out vertically after passing through the Fresnel prisms 5 and 6 in order to maintain the distance between the two light beams where the center axis C of the TV camera is not placed at the center axis of the borehole.

Figure 22:
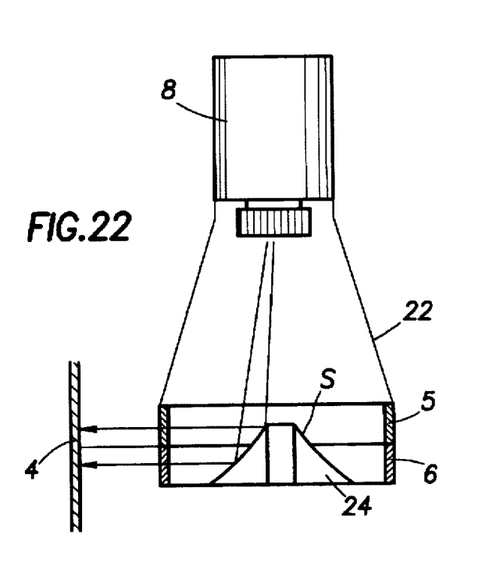
FIG. 22 is a graphical representation of the three dimensional imaging system with a parabolic conical mirror.
Figure 23:
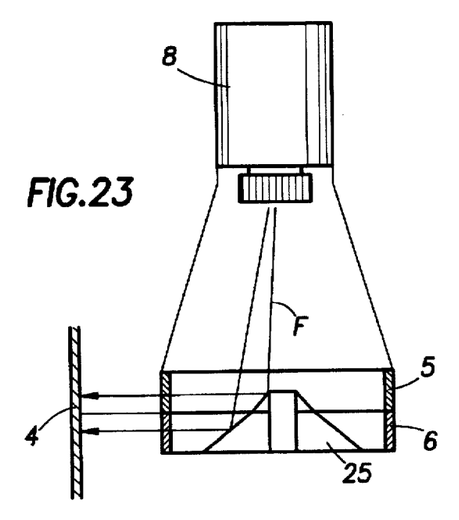
FIG. 23 is a graphical representation of the three dimensional imaging system with a double level conical mirror.

Also, as shown in FIG. 22, the same result can be obtained by using a conical mirror 24 with a surface S that has a conical shape with a concave parabolic line. Furthermore, as shown in FIG. 23, optical beams F which pass through Fresnel prisms 5 and 6 can be corrected so that both light beams reach the borehole surface at right angles and parallel to each other by installing a two level conical mirror 25 that is a combination of two cones with a different slope angle which aligns with the two Fresnel prisms 5 and 6.

Figure 24:
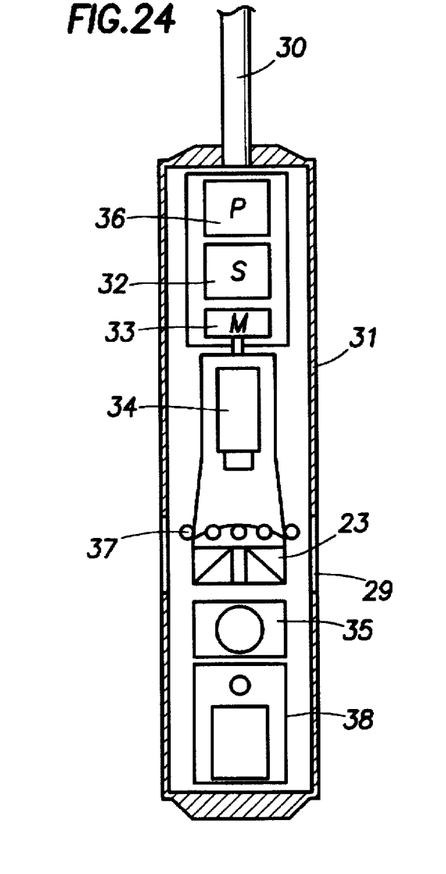
FIG. 24 is a cross-sectional view of an embodiment of the three dimensional imaging system.

As shown in FIG. 24, the prism body 23 which, for example, is explained in FIG. 5, 20, 21, 22 and 23, is installed within a probe 31 that moves up and down the borehole by means of wire 30 that is connected to an operating system that is not shown here. Within this probe 31, a TV camera 34 is installed above the prism body 23, and rotates around the axis controlled by the camera azimuth sensor control motor 33. The direction of the camera 34 is controlled by a signal from magnetic azimuth sensor 32. Furthermore, the magnetic azimuth sensor compass 35 is installed below the prism body 23. A power source unit 36, a borehole wall lighting lamps 37, a compass lighting system 38, and a battery are also present in the probe 31. A transparent window 39 is installed on the side where the prism body 23 is located. Preferably, in order to keep the illumination constant, lighting lamps 37 are comprised of multiple small lamps.

Figure 25:
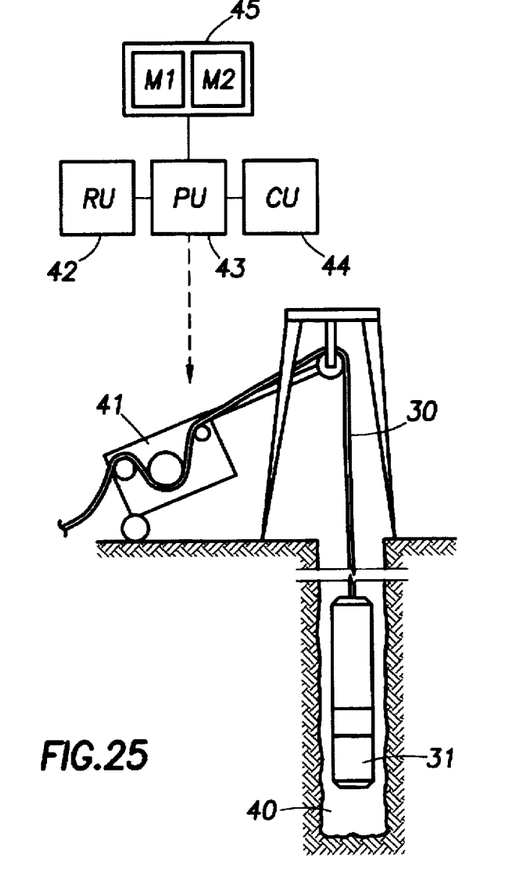
FIG. 25 is a pictorial view of an embodiment of the three dimensional imaging system.

The probe 31 is lowered underground into the borehole 40 as shown in FIG. 25. The above ground equipment comprises a depth measuring device 41 that measures the depth of probe 31, which is connected with a wire 30, an image recording system 42, an image processing system 43, a probe control system 44, and two connected monitors 45, which project the two images that are required for three dimensional viewing. The image recording system 42 consists of a digital recording device such as floppy disk driver, magneto optical disk driver or magnetic tape driver and so on. The image recording system 42 also include a VTR system which produces a recording. The image processing system 43 converts the analog TV camera image into digital and processes the conical mirror image into stereoscopic projected images that are directed to the azimuth signals which are sent from the azimuth sensor. The probe control system 44 supplies electricity to the probe and controls the TV camera direction by means of a motor which installed in the probe. By using this equipment, the probe 31 is lowered gradually into the borehole 40 to acquire the images for three dimensional viewing.

Figure 26:
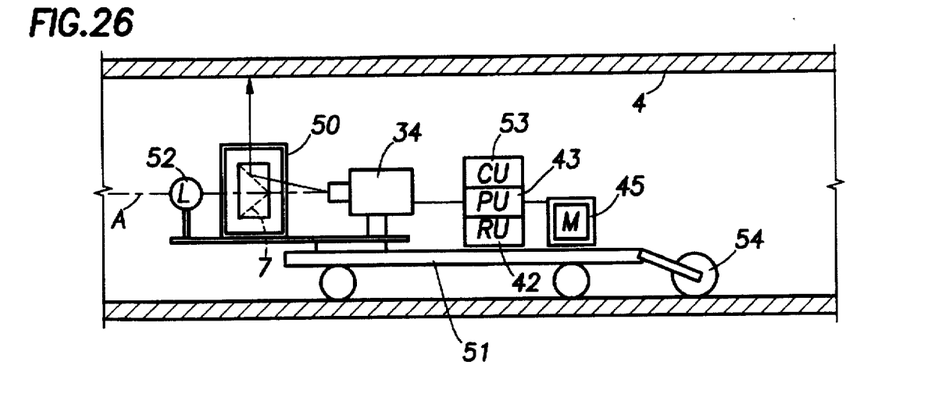
FIG. 26 is a pictorial view of an embodiment of the three dimensional imaging system.

A continuous three dimensional image of a horizontal borehole wall 4 can be acquired using the embodiment as shown in FIG. 26. A conical mirror 7 is placed inside of a cylindrical prism 50 along the direction of prism axis A. Cylindrical prism 50 consists of a pair of cylindrical Fresnel prisms. This unit of a three dimensional image acquisition prism, consisting of the conical mirror 7 and cylindrical prism 50, is installed on top of a borehole cart 51 in a horizontal alignment. In addition, a borehole lighting lamp 52 and a TV camera 34 are positioned on top of the cart 51, and aligned with the center axis of prism 50. An image recording system 42, an image processing system 43, a camera and lighting control system 53, as well as two serial monitors 45, are also installed on top of cart 51. Distance is measured by a distance measuring wheel 54. Distance measuring wheel 54 has installed a pulse encoder which generates electric pulses in regular intervals. These electric pulses are sent to the image processing system and work as the trigger signals of the image processing routine. The present invention has the capability to process in real time a pair of stereoscopic images of the projected images of a borehole wall. By taking the measurement of the location of the same point in the pair of three dimensional images as acquired by this process, the distance between the point and the borehole axis (the radius of the borehole) can be measured.

Figure 27:
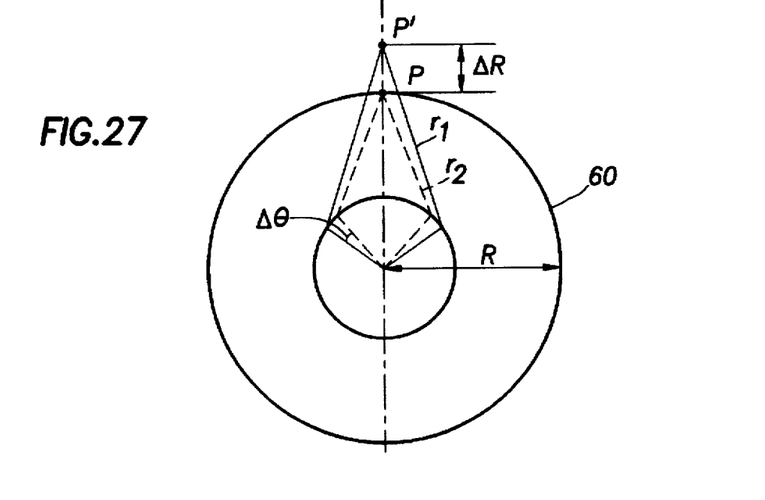
FIG. 27 is a graphical representation of the prism receiving images from the borehole wall.
Figure 28A:
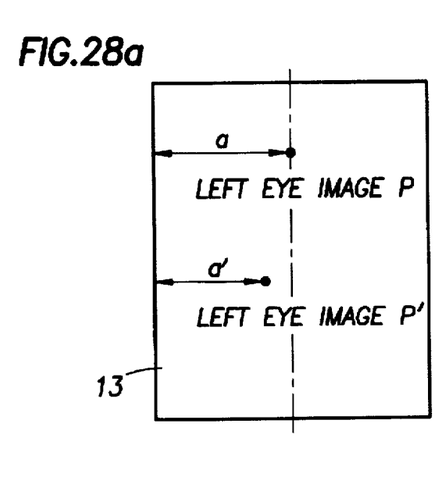
FIG. 28 is a graphical representation of the three dimensional image processing.
Figure 28B:
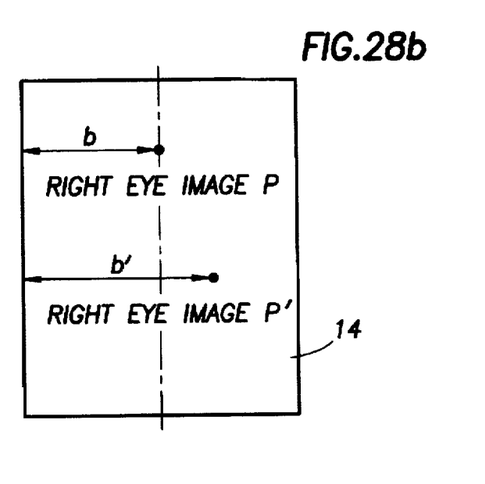

As shown in FIG. 27, a parallax angle is established so that the optical beams $r_1$ and $r_2$ cross on the borehole wall 60 at a certain radius R, and produce a pair of three dimensional images, P and P'. Point P on the standard borehole wall 60 appears in the same position on the left/right eye developed images 13 and 14 as shown in FIG. 28. More specifically, b −a=0. On the other hand, point P', which is located farther behind the standard borehole wall 60, will appear differently on the left/right eye developed images 13 and 14, and b'−a'≠0. As shown on FIG. 27, the size of c correlates to angle $\Delta\theta$, and furthermore angle $\Delta\theta$ correlates to distance $\Delta R$, which is the distance between point P' and point P on the standard borehole wall 60. Therefore, by measuring the position of a' and b', the change of the borehole wall R, can be determined.

Figure 29A:
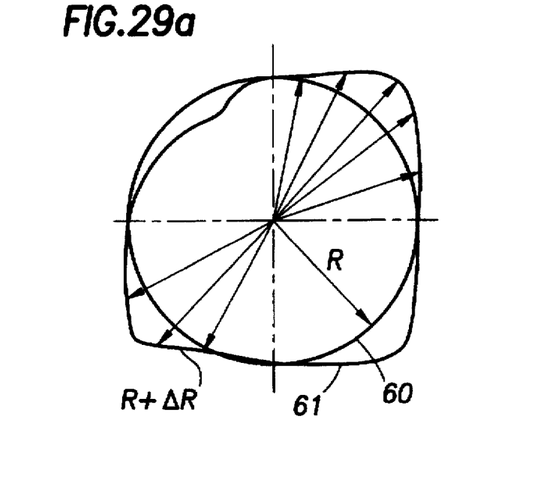
FIGS. 29(a) and (b) are graphical representations of an example of a borehole survey.
Figure 29B:
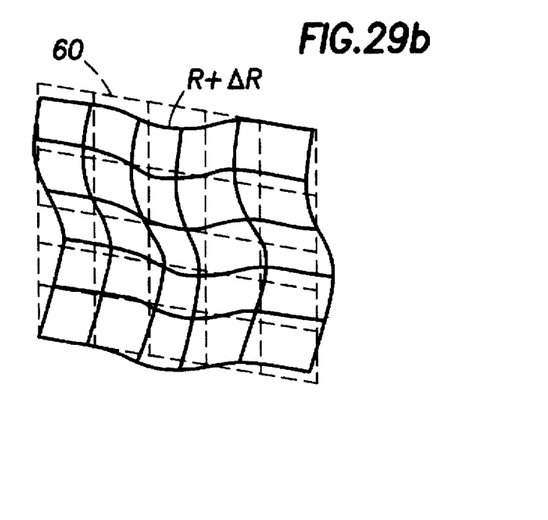

By repeating this procedure many times, the condition of the entire borehole wall 60 can be found as shown in FIG. 29. In FIG. 29(a), the cross section 50 of a standard borehole wall is shown with the radius R. R+$\Delta$R shows the measured distance based on the pair of stereoscopic images. As the result of many measurements, the actual borehole cross section is drawn as the line 61 in the figure. FIG. 29(b) shows this result in a projected model as a squint drawing.

The present invention, therefore, is well-adapted to carry out the objects and attain the ends and advantages mentioned, as well as others inherent therein. While presently preferred embodiments of the invention have been given for the purpose of disclosure, numerous changes in the details of construction, arrangement of parts, and steps of the process, may be made which will readily suggest themselves to those skilled in the art and which are encompassed within the spirit of the invention and the scope of the appended claims.

What is claimed is:

1. A method for producing a three dimensional image of a borehole wall, the method comprising the steps of:

receiving a first visual image from a portion of a borehole wall through a cylindrical prism device, wherein the cylindrical prism device is located in the interior of the borehole, said cylindrical prism device comprising a transparent cylinder which includes a plurality of triangular columns and a plurality of grooves along a circumference of the cylinder, wherein each of the plurality of grooves is between a corresponding pair of the plurality of triangular columns;

receiving a second visual image from the portion of the borehole wall through said cylindrical prism device, wherein the second visual image is from a different orientation of the borehole wall than the first visual image;

reflecting the first visual image on a conical mirror that is located inside the cylindrical prism device to create a first ring-shaped image of the borehole wall;

reflecting the second visual image on the conical mirror to create a second ring-shaped image of the borehole wall that is located adjacent to the fast ring shaped image; and processing the first and second ring shaped images by dividing the images into sections in order to create a left eye viewing image and a right eye viewing image.

2. A system for producing a three dimensional image of a borehole wall, the system comprising:

a surveying body device;

a cylindrical prism device having a central axis, wherein the cylindrical prism device is connected to the surveying body device, said cylindrical prism device comprising a transparent cylinder which includes a plurality of triangular columns and a plurality of grooves along a circumference of the cylinder, wherein each of the plurality of grooves is between a corresponding pair of the plurality of triangular columns;

wherein a first and a second image of a portion of the borehole wall pass through the cylindrical prism device, said first and second images being images of the borehole wall from different orientations;

a camera device connected to the surveying body device;

a conical mirror device connected to the surveying body device, wherein the conical mirror device is located in the interior of and aligned along the center axis of the cylindrical prism device, wherein the first image of the borehole wall is received from the cylindrical prism device and reflected by the conical mirror device to the camera device, wherein the second image of the borehole wall is received from the cylindrical prism device and reflected by the conical mirror device to the camera device; and an image processing device connected to the camera device, wherein the first and second images of the borehole wall from the camera device are received by the image processing device, wherein the image processing device converts the first and second images of the borehole wall into a a left eye image and a right eye image.

3. The system according to claim 2 wherein the conical mirror device is longer than the height of the cylindrical prism device.

4. The system according to claim 2 wherein the conical mirror device further comprises a first conical mirror and a second conical mirror, wherein the slope of the first conical mirror is not equal to the slope of the second conical mirror.

5. The system according to claim 2 further comprising a correctional lens device positioned relative to the conical mirror device and the camera device so that all images that pass through the cylindrical prism device intersect the center axis of the conical mirror device at a right angle.

6. The system according to claim 2 wherein the conical mirror device, s a rotating parabolic mirror, positioned relative to the cylindrical prism device so that all images that pass through the cylindrical prism device intersect the center axis of the conical mirror device at a right angle.

7. The system according to claim 2 wherein the conical mirror device is a flat top conical mirror that includes a hole or a cylinder shaped transparent material positioned along the center axis of the conical mirror device, wherein an image of an azimuth sensor is received at the camera along with the images of the borehole wall.

8. The method according to claim 1, wherein the shape of the cross-section of each of the plurality of triangular columns is an isosceles triangle.

9. The method according to claim 1, said cylindrical prism device further comprising a first cylindrical prism having a central axis and a second cylindrical prism having a central axis coincident with the central axis of the first cylindrical prism, the first cylindrical prism being a cylindrical straight prism and the second cylindrical prism being a counter cylindrical straight prism, and the cylindrical straight prism and the counter cylindrical straight prism each being made of a transparent material.

10. The method according to claim 9, wherein said cylindrical straight prism is adjacent said counter cylindrical straight prism.

11. The method according to claim 10, wherein the shape of the cross-section of each of said plurality of triangular columns is a right triangle, the orientation of each of the plurality of triangular columns in the counter cylindrical straight prism being the reverse of the orientation of each of the plurality of triangular columns in the cylindrical straight prism.

12. The system according to claim 2, wherein the shape of the cross-section of each of the plurality of triangular columns of said cylindrical straight prism and said counter cylindrical straight prism is an isosceles triangle.

13. The system according to claim 2, said cylindrical prism device further comprising a first cylindrical straight prism and a second counter cylindrical straight prism, said first cylindrical straight prism and said second counter cylindrical straight prism each having a central axis coincident with the axis of the cylindrical prism device, wherein each comprises a transparent material.

14. The system according to claim 13, wherein said cylindrical straight prism is adjacent said counter cylindrical straight prism.

15. The system according to claim 14, wherein the shape of the cross-section of each of said plurality of triangular columns of said cylindrical straight prism and said counter cylindrical straight prism is a right triangle, the orientation of each of the plurality of triangular columns in the counter cylindrical prism being the reverse of the orientation of each of the plurality of triangular columns in the cylindrical straight prism.

\* \* \* \* \*